United States Patent [19]

Santamaria

[11] Patent Number: 5,110,236
[45] Date of Patent: May 5, 1992

[54] SELF-RIGHTING OIL CONTAINMENT BOOM

[75] Inventor: Joseph P. Santamaria, Alexandria, N.H.

[73] Assignee: JPS/Oiltrol, Inc., Bristol, N.H.

[21] Appl. No.: 536,301

[22] Filed: Jun. 11, 1990

[51] Int. Cl.$^5$ ............................................. E02B 15/04
[52] U.S. Cl. ................................................ 405/63; 405/60
[58] Field of Search ........................................ 405/63-72

[56] References Cited

U.S. PATENT DOCUMENTS

| | | |
|---|---|---|
| Re. 27,452 | 8/1972 | Smith . |
| 3,499,290 | 3/1970 | Smith . |
| 3,563,036 | 2/1971 | Smith . |
| 3,564,852 | 2/1971 | Smith . |
| 3,640,073 | 2/1972 | Samsel . |
| 3,691,773 | 9/1972 | Ruhlman . |
| 3,731,491 | 5/1973 | Markel et al. ............ 405/67 |
| 3,740,955 | 6/1973 | Fossberg . |
| 3,751,925 | 8/1973 | Thurman . |
| 3,756,031 | 9/1973 | Smith . |
| 3,798,913 | 3/1974 | Dubois ................... 405/66 |
| 3,848,417 | 11/1974 | Smith . |
| 3,852,978 | 12/1974 | Fossberg ................. 405/67 |
| 3,859,796 | 1/1975 | Benson . |
| 3,868,824 | 3/1975 | Thurman . |
| 3,886,750 | 6/1975 | Ayers . |
| 3,903,701 | 9/1975 | Gauch . |
| 3,906,732 | 9/1975 | Tedeschi . |
| 3,922,860 | 12/1975 | Tanksley . |
| 3,924,412 | 12/1975 | Bennett . |
| 3,939,663 | 2/1976 | Tezuka . |
| 3,966,614 | 6/1976 | Ayers ................... 210/242 R |
| 3,973,406 | 8/1976 | Casey . |
| 3,979,291 | 9/1976 | Veld .................... 210/84 |
| 3,983,034 | 9/1976 | Wilson .................. 210/73 W |
| 4,000,532 | 1/1977 | Nielsen . |
| 4,006,082 | 2/1977 | Irons ................... 210/83 |
| 4,014,795 | 3/1977 | Veld .................... 210/242 R |
| 4,015,431 | 4/1977 | Ahiko . |
| 4,016,726 | 4/1977 | Campbell . |
| 4,049,554 | 9/1977 | Ayers ................... 210/242 S |
| 4,051,038 | 9/1977 | Veld .................... 210/242 S |
| 4,056,472 | 11/1977 | Teasdale ................ 210/242 S |
| 4,073,143 | 2/1978 | Preus . |
| 4,076,624 | 2/1978 | Tolan ................... 210/96 R |
| 4,085,049 | 4/1978 | Hartwick ................ 210/242 S |
| 4,096,700 | 6/1978 | Muramatsu . |
| 4,100,746 | 7/1978 | Preus . |
| 4,142,972 | 3/1979 | Nebeker ................. 210/84 |
| 4,145,290 | 3/1979 | Nagy ................... 210/242 S |
| 4,145,292 | 3/1979 | Veld .................... 210/242 R |
| 4,146,344 | 3/1979 | Steen ................... 405/68 |

FOREIGN PATENT DOCUMENTS

| | | | |
|---|---|---|---|
| 1249315 | 11/1960 | France | .................... 405/70 |
| 2009655 | 2/1970 | France | .................... 405/66 |
| 2440441 | 7/1980 | France | .................... 405/70 |
| 2475597 | 8/1981 | France | .................... 405/63 |

*Primary Examiner*—Dennis L. Taylor
*Attorney, Agent, or Firm*—Weingarten, Schurgin, Gagnebin & Hayes

[57] ABSTRACT

An oil containment boom capable of maintaining a generally vertical orientation in water is disclosed. The containment boom includes a longitudinally extending curtain maintained vertically in the water by floats positioned in pairs in opposed relation along each side of the curtain. The floats are attached by a tether which extends through an opening in the curtain. The tether is capable of reciprocating motion through the opening in the curtain, which allows the floats of each pair to maintain positions in the water which are vertically offset from each other. When the water level on one side of the curtain is higher than on the other side, the float on the high water side rises to a higher position than the float on the opposite side and tends to pull the curtain back into a vertical orientation. The curtain may also include a weight along its lower edge. The self-righting feature of the present oil boom helps to prevent contaminants from washing over the top of the boom in rough areas.

16 Claims, 1 Drawing Sheet

U.S. PATENT DOCUMENTS

| | | | |
|---|---|---|---|
| 4,188,155 | 2/1980 | Langermann | 405/63 |
| 4,190,381 | 2/1980 | Knaus | 405/72 |
| 4,201,495 | 5/1980 | Preus | 405/63 |
| 4,208,287 | 6/1980 | Brieck | 210/242 S |
| 4,230,419 | 10/1980 | McConaughy | 405/66 |
| 4,295,756 | 10/1981 | Blair | 405/70 |
| 4,300,856 | 11/1981 | Magoon | 405/66 |
| 4,300,857 | 11/1981 | Santamaria | 405/70 |
| 4,325,653 | 4/1982 | Teasdale | 405/68 |
| 4,325,826 | 4/1982 | van Waveren | 210/776 |
| 4,348,136 | 9/1982 | Donovan | 405/65 |
| 4,381,994 | 5/1983 | Ayers | 210/120 |
| 4,403,888 | 9/1983 | Teasdale | 405/68 |
| 4,507,017 | 3/1985 | Mangeen | 405/66 |
| 4,554,070 | 11/1985 | Jordan | 210/109 |
| 4,588,501 | 5/1986 | Jordan | 210/109 |
| 4,696,318 | 9/1987 | Smith | 134/73 |
| 4,840,729 | 6/1989 | Levine | 210/170 |

5,110,236

SELF-RIGHTING OIL CONTAINMENT BOOM

FIELD OF THE INVENTION

The present invention relates generally to booms for containing spills of oil or other contaminants in water and, more particularly, to a boom capable of maintaining a generally vertical orientation in water.

BACKGROUND OF THE INVENTION

When a contaminant such as oil spills into water, as, for example, when an oil tanker runs aground or breaks apart, it is desirable to surround the spill with a containment boom as quickly as possible to prevent the oil or other contaminant from traveling far from the location of the spill and doing increased environmental damage. Various types of oil booms or curtains have been used for this purpose. A typical curtain is shown in U.S. Pat. No. 4,300,857. Such a curtain includes floats attached on each side of the curtain to keep a portion of the curtain extending above the surface of the water to Prevent the oil from splashing over the top of the curtain and escaping from the containment area. In other curtain configurations, a flotation material may be enclosed with a Pocket near the top of the curtain. A disadvantage with such curtains, however, arises in rough seas where large waves tend to push the curtain over, away from its vertical orientation, possibly allowing water and contaminants to splash over the top of the curtain.

SUMMARY OF THE INVENTION

The present invention provides an oil containment boom which is self-righting to maintain a generally vertical orientation in water, thereby tending to prevent contaminants from washing over the top of the boom.

The preferred embodiment of the present oil boom comprises a longitudinally extending curtain which is suspended from flotation devices at the surface of the water. The curtain extends downwardly into the water and also projects upwardly beyond the flotation devices above the surface of the water a distance sufficient to contain the water and contaminants on one side of the curtain. The flotation devices preferably comprise floats disposed in pairs. A tether connects each float of the pair together. The tether extends through an opening in the curtain and is movable therethrough in a reciprocating motion. This reciprocating motion allows each float of a pair to have a vertical position in the water displaced from the vertical position of the other float. When a wave impacts the curtain, the water level on the wave side of the curtain is higher than the water level on the other side of the curtain. The float on the wave side rises up toward the surface of the water, pulling on the tether. The opposite float is pulled adjacent to the curtain and abuts the curtain in the vicinity of the opening. This action by the floats exerts a force on the curtain, which tends to bring the curtain back into a vertical orientation.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
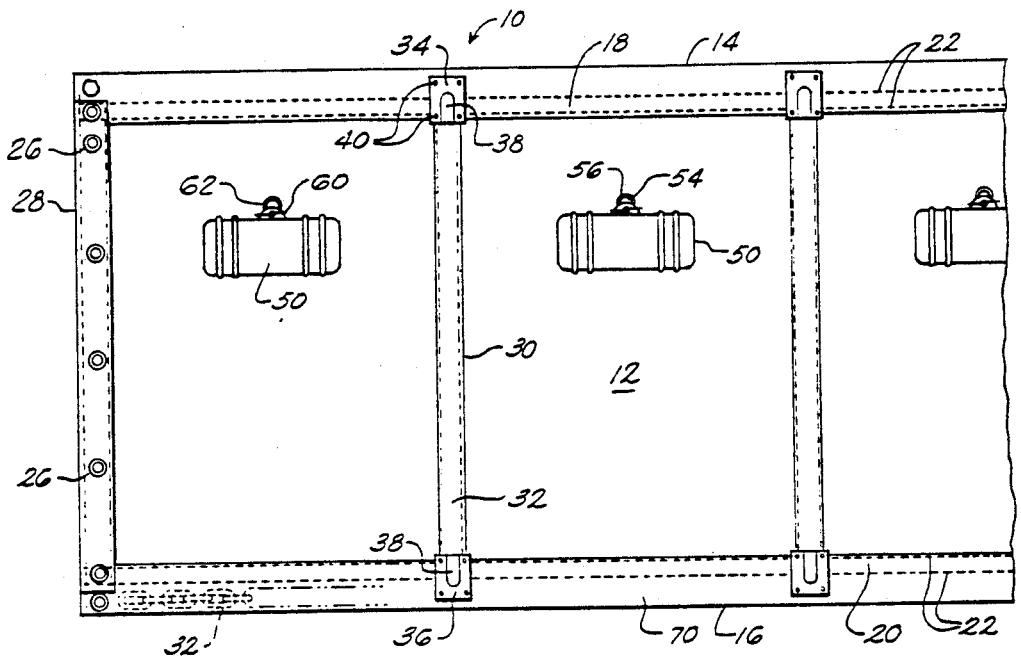
FIG. 1 is a side elevational view of a portion of the oil boom of the present invention.
Figure 3:
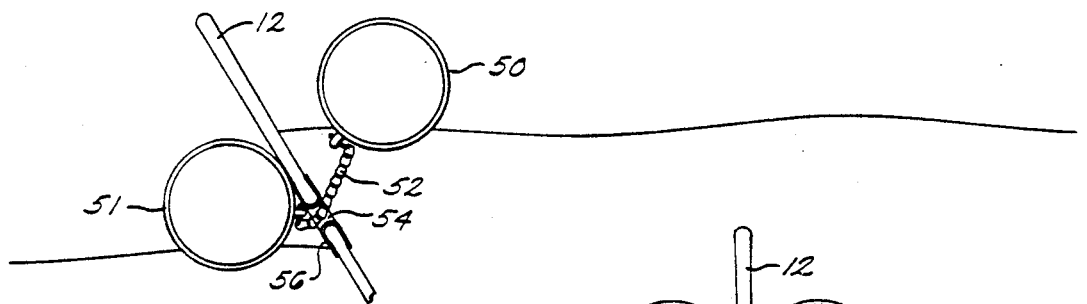
FIG. 3 is a further cross-sectional side view of the oil boom of FIG. 1.
Figure 2:
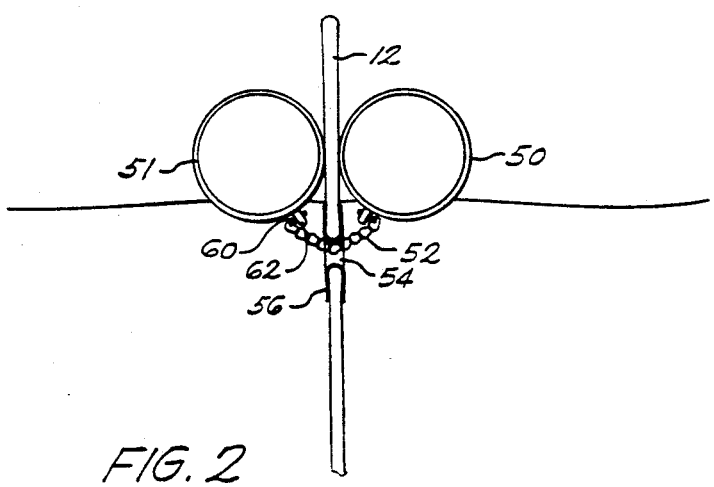
FIG. 2 is a cross-sectional side view of the oil boom of FIG. 1.

A preferred embodiment of the present invention is shown in FIGS. 1-3. A boom 10 comprises a longitudinally extending curtain 12 formed of a flexible material impervious to water and contaminants such as oil. The upper and lower perimeters 14, 16 of the curtain are provided with a reinforcing strip 18, 20 produced by folding the edge onto itself. A strip of reinforcing material (not shown) may be inserted into the fold. The folded edge is then stitched together, preferably by use of a double-locked stitch 22. Grommets 26 may be provided along ends 28. Ribs 30 are vertically aligned and arrayed along the length of the curtain in an equally-spaced parallel relationship. The ribs 30 supply rigidity to the curtain, yet are flexible enough to bend under the application of extreme force and are resilient enough to return to their normal shape subsequent to being bent. The ribs 30 are preferably disposed within a pocket formed by a strip of curtain material 32 stitched to the curtain on one side thereof. Pairs of reinforcing plates 34, 36 are secured onto both sides of the curtain at the top and bottom of the ribs by means of bolts or other known securing means. One or both of the plates at an end of the rib preferably have a recess 38 which is contoured to accommodate the shape of the end of the rib. Typically, a set of bolts 40 passes through both plates of a pair to secure them together and to secure both plates to the curtain. The plates serve to prevent the ribs from popping out of the pocket and to prevent the strip from being torn free of the curtain. The ribs ensure that the curtain retains sufficient rigidity to remain vertically positioned in the water while still remaining flexible enough to absorb high winds or waves.

In the preferred embodiment, a plurality of floats 50, 51 is attached to the curtain 12 along the length thereof to maintain the upper edge of the curtain above the water level. As shown in FIGS. 2 and 3, the floats are preferably disposed in pairs directly opposite one another along each side of the curtain. The pairs of floats 50, 51 are arrayed in an equally-spaced alignment intermediate the spaced ribs 30 along a line substantially parallel to the top edge of the curtain. Tethers 52 pass through openings 54 in the curtain intermediate the top and bottom edges. Each end of the tether is fastened to one float of each pair of floats The opening in the curtain is preferably reinforced with a grommet 56. The tether 52 typically comprises a chain. The tethers are provided with toggles 60 on the ends thereof which may be inserted through loops 62 formed on the surface of the floats. In this manner, the floats are easily removed from the curtain for replacement or repair. The floats 50, 51 are typically formed as sealed hollow cylinders from a waterproof plastic material.

The tether 52 is capable of a reciprocating motion through the opening 54 in the curtain 12. The length of the tether 52 preferably is such that when one float 51 is pulled adjacent to the curtain, the other float 50 remains at a distance below the top edge of the curtain so that a portion of the curtain remains above the surface of the water, as shown in FIG. 3. The openings 54 preferably are spaced closer to the top edge of the curtain than to the bottom edge. In this manner, one float may be vertically displaced relative to the other float. When a wave pushes against one side of the curtain, raising the water level on that side of the curtain, the float 50 on the wave side of the curtain rises up to the greater water level. The float 51 on the opposite side of the curtain is pulled adjacent to the curtain 12 in the vicinity of the opening 54 and abuts the curtain 12. This action of the floats 50, 51 tends to pull the curtain back into a vertical orientation.

The reinforcing strip 20 along the bottom edge of the curtain 12 which extends below the surface of the water Preferably is formed as a casing 70. A chain 72 is disposed in the casing 70 and extends from side to side along the length of the curtain. The chain is fastened to the curtain at each end and absorbs tensile forces placed on the boom. The chain may be made of any material which is significantly heavier than water and acts as a weight or ballast for the curtain. In this manner, the chain aids in maintaining the curtain in a vertical orientation by keeping the lower edge below the water level. Alternatively, the chain could be placed outside the curtain, attached to the bottom edge at the grommetted openings spaced along the bottom edge. In a further alternative, a strong nylon strap could be placed along the bottom edge and lead weights placed at intervals could serve as ballast. A nylon line may also be provided along the bottom and top edges of the curtain to absorb tensile forces.

Ends of two adjacent curtains may be attached by suitable connectors which pass through the grommets on the ends of each of the curtains to form a boom of any desired length. In an alternative deployment, the curtain may be anchored to the bottom of a body of water by attachment to posts or other suitable anchors.

The curtain may be formed in any suitable length and width. Typical sizes range from twelve inch widths to thirty-six inch widths. The ribs are generally placed every two feet along the length of the curtain between each pair of floats. The floats may be of any convenient size, but typically are cylinders having a diameter of about five inches and a length of about ten inches. The plates and grommets are typically formed of stainless steel. The curtain is typically a nylon webbing impregnated with polyvinylchloride. The nylon webbing typically has a lock stitch to prevent tearing thereof. The stitching thread is typically a silicon-treated nylon. The nylon contained in the curtain is typically twenty-two ounce nylon with a six hundred pound per square inch tensile strength. The floats are formed of molded polypropylene or pressed polyurethane with an ultraviolet radiation inhibitor. The ribs typically are formed of fiberglass.

The invention is not to be limited by what has been particularly shown and described, except as indicated in the appended claims.

I claim:

1. A boom for containing a contaminant in a body of water comprising:
    means for forming a longitudinal barrier at the surface of the water; and
    float means on opposite sides of the barrier for maintaining the barrier forming means afloat in a substantially vertical orientation in the water; and
    means attached to the float means and freely reciprocatable through an opening in the interior of the barrier forming means for allowing the float means to assume different levels in the water to enable the barrier forming means to maintain a substantially vertical orientation in the water.

2. The boom of claim 1, wherein the barrier forming means comprises a flexible, impermeable curtain.

3. The boom of claim 2, wherein the float means comprises two floats disposed on opposite sides of the curtain and the freely reciprocatable means comprises a tether having two ends, each end being attached to one of the floats, the tether being disposed through the opening for freely reciprocating motion therethrough.

4. A boom for containing a contaminant in a body of water comprising:
    means for forming a longitudinal barrier in the water, the barrier forming means having a first side and a second side and an opening disposed between longitudinal edges of the barrier forming means, the opening extending between the first side and the second side;
    means for maintaining the barrier forming means afloat in the water in a substantially vertical position with a portion of the barrier forming means extending above the surface of the water, the maintaining means mounted to the barrier forming means for freely reciprocal motion through the opening between the first side and the second side to assume different levels in the water.

5. The boom of claim 4, wherein the barrier forming means comprises a flexible, impermeable curtain.

6. The boom of claim 5, wherein the maintaining means comprises two floats disposed on opposite sides of the curtain and a tether having two ends, each end being attached to one of the floats, the tether being disposed through the opening for freely reciprocating motion therethrough.

7. A boom for containing contaminants spilled in water comprising:
    a barrier comprising a longitudinally extending, flexible, fluid impermeable curtain;
    an opening in the interior of the curtain;
    a tether extending freely through the opening, the tether having a first end disposed on one side of the curtain and a second end disposed on the opposite side of the curtain;
    a first float attached to the first end of the tether; and
    a second float attached to the second end of the tether;
    whereby the tether allows the first float and the second float to assume different positions on the respective sides of the curtain.

8. The boom of claim 7, wherein the opening is disposed between top and bottom edges of the curtain.

9. The boom of claim 8, wherein the opening is disposed nearer to the top edge of the curtain.

10. The boom of claim 7 further comprising a grommet surrounding the opening in the curtain.

11. The boom of claim 7, wherein the tether is a chain.

12. The boom of claim 7, wherein the first and second floats are hollow watertight canisters.

13. The boom of claim 12, wherein the canisters are removably attached to the ends of the tether.

14. The boom of claim 7, wherein the tether is of a sufficient length to permit freely reciprocating motion of the tether through the opening.

15. The boom of claim 7, wherein the barrier further comprises a pocket formed along a bottom edge of the curtain and a weight is disposed in the pocket.

16. A boom for containing contaminants spilled in a body of water comprising:
- a flexible impermeable curtain extending longitudinally through a body of water, the curtain having a first side, a second side, an upper longitudinal edge, and a lower longitudinal edge;
- a plurality of openings disposed in the curtain between the upper longitudinal edge and the lower longitudinal edge along a line generally parallel to the upper and lower longitudinal edges;
- a plurality of tethers, each tether disposed for freely reciprocating motion through an associated opening; and
- a plurality of hollow, cylindrical floats disposed on the first side and the second side of the curtain, the floats being associated in paris, the floats of each pair attached together by one of the tethers disposed through one of the openings in the curtain to assume different positions in the water one each side of the curtain and to maintain the upper longitudinal edge of the curtain at a distance above the surface of the water.

* * * * *

UNITED STATES PATENT AND TRADEMARK OFFICE
CERTIFICATE OF CORRECTION

PATENT NO. : 5,110,236
DATED : May 5, 1992
INVENTOR(S) : Joseph P. Santamaria

It is certified that error appears in the above-identified patent and that said Letters Patent is hereby corrected as shown below:

In the Abstract, last line, "areas" should read --seas--.

In column 6, line 6, "paris" should read --pairs--.

In column 6, line 9, "one" should read --on--.

Signed and Sealed this

Twenty-sixth Day of October, 1993

Attest:

BRUCE LEHMAN

*Attesting Officer*  *Commissioner of Patents and Trademarks*